United States Patent

Kamata (10) Patent No.: US 9,933,982 B2
(45) Date of Patent: Apr. 3, 2018

(54) MANAGING PRINT JOB ASSOCIATED PROCESSING BY USER PROCESSES ASSOCIATED WITH SEPARATE LOGGED-IN USERS OF AN INFORMATION PROCESSING APPARATUS

(71) Applicant: Takehiro Kamata, Tokyo (JP)

(72) Inventor: Takehiro Kamata, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/447,323

(22) Filed: Mar. 2, 2017

(65) Prior Publication Data

US 2017/0269888 A1   Sep. 21, 2017

(30) Foreign Application Priority Data

Mar. 18, 2016   (JP) ................................ 2016-056307

(51) Int. Cl.
 *G06F 3/12*   (2006.01)
(52) U.S. Cl.
 CPC .......... *G06F 3/1263* (2013.01); *G06F 3/1203* (2013.01); *G06F 3/1204* (2013.01); *G06F 3/1224* (2013.01); *G06F 3/1285* (2013.01); *G06F 3/1288* (2013.01)
(58) Field of Classification Search
 None
 See application file for complete search history.

(56) References Cited

U.S. PATENT DOCUMENTS

| 2013/0094056 A1 | 4/2013 | Kobayashi | |
| 2016/0004483 A1* | 1/2016 | Yamakawa | G06F 3/1204 358/1.14 |
| 2016/0063366 A1* | 3/2016 | Harano | G06K 15/4095 358/1.14 |

FOREIGN PATENT DOCUMENTS

JP   2013-008353   1/2013

OTHER PUBLICATIONS

Extended European Search Report dated Aug. 7, 2017 issued in corresponding European Application No. 17159611.7-1879.

\* cited by examiner

*Primary Examiner* — Henok A Shiferaw
(74) *Attorney, Agent, or Firm* — Harness, Dickey & Pierce, PLC (57) ABSTRACT

An information processing apparatus includes: circuitry configured to detect whether or not a print job is caused to be stuck in a printer queue where printer jobs are to be stored, the print job containing attribute information and data to be printed, the attribute information containing a printing condition; when detecting that the print job is stuck in the printer queue, specify user information, by which a user that has requested printing is identified; and provide information for use in processing to be performed by a user process, the user process being one, the one being associated with the specified user information, of a plurality of user processes that are in a one-to-one correspondence with a plurality of currently-logged-in users.

20 Claims, 9 Drawing Sheets

MANAGING PRINT JOB ASSOCIATED PROCESSING BY USER PROCESSES ASSOCIATED WITH SEPARATE LOGGED-IN USERS OF AN INFORMATION PROCESSING APPARATUS

CROSS-REFERENCE TO RELATED APPLICATIONS

The present application claims priority under 35 U.S.C. § 119 to Japanese Patent Application No. 2016-056307, filed on Mar. 18, 2016. The contents of which are incorporated herein by reference in their entirety.

BACKGROUND OF THE INVENTION

1. Field of the Invention

The present invention relates generally to information processing apparatuses, information processing methods, and computer-readable recording media.

2. Description of the Related Art

Conventionally, a system that allocates a print job to one of image forming apparatuses according to a predetermined condition is known. An example of such a system is disclosed in Japanese Unexamined Patent Application Publication No. 2013-008353 (Patent Document 1). In such a system, when a request for printing a print job is issued by a user of a client terminal, the client terminal implements a function of determining whether or not the print job satisfies a preset condition(s) and causing an image forming apparatus, which is determined depending on the satisfied condition(s), to perform printing of the print job. The system can be configured to display a confirmation screen for asking the user to confirm again whether or not to perform printing when the print job satisfies a specific condition.

When such a system as that described above is used, a situation can arise where it is desired to display a UI (user interface) for accepting confirmation on an operation screen for a logged-in user (authenticated as being authorized to use the system) or it is desired to cause a setting value(s) specific to the user to take effect. Although these functions are to be provided by a user process running in a session for the logged-in user, when there are a plurality of currently-logged-in users, the need for appropriately allocating processes from components (service process) running as a common service within the system to each of a plurality of user processes that are in a one-to-one correspondence with the plurality of currently-logged-in users arises. However, a technique for efficiently controlling job execution through cooperation between the service process and the user processes is not conventionally provided.

SUMMARY OF THE INVENTION

According to exemplary embodiments of the present invention, there is provided An information processing apparatus comprising: circuitry configured to detect whether or not a print job is caused to be stuck in a printer queue where printer jobs are to be stored, the print job containing attribute information and data to be printed, the attribute information containing a printing condition; when detecting that the print job is stuck in the printer queue, specify user information, by which a user that has requested printing is identified; and provide information for use in processing to be performed by a user process, the user process being one, the one being associated with the specified user information, of a plurality of user processes that are in a one-to-one correspondence with a plurality of currently-logged-in users.

Exemplary embodiments of the present invention also provide an information processing method comprising: performing printer queue detection by detecting whether or not a print job is caused to be stuck in a printer queue where printer jobs are to be stored, the printer job containing attribute information and data to be printed, the attribute information containing a printing condition; specifying, when it is detected that the print job is stuck in the printer queue at the printer queue detection, user information, by which a user that has requested printing is identified; and providing information for use in processing to be performed by a user process, the user process being one, the one being associated with the user information specified at the specifying, of a plurality of user processes that are in a one-to-one correspondence with a plurality of currently-logged-in users.

Exemplary embodiments of the present invention also provide a non-transitory computer-readable recording medium containing instructions that, when executed by a computer, cause the computer to perform: performing printer queue detection by detecting whether or not a print job is caused to be stuck in a printer queue where printer jobs are to be stored, the printer job containing attribute information and data to be printed, the attribute information containing a printing condition; specifying, when it is detected that the print job is stuck in the printer queue at the printer queue detection, user information, by which a user that has requested printing is identified; and providing information for use in processing to be performed by a user process, the user process being one, the one being associated with the user information specified at the specifying, of a plurality of user processes that are in a one-to-one correspondence with a plurality of currently-logged-in users.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Exemplary embodiments of the present invention are described in detail below with reference to the accompanying drawings.

Figure 1:
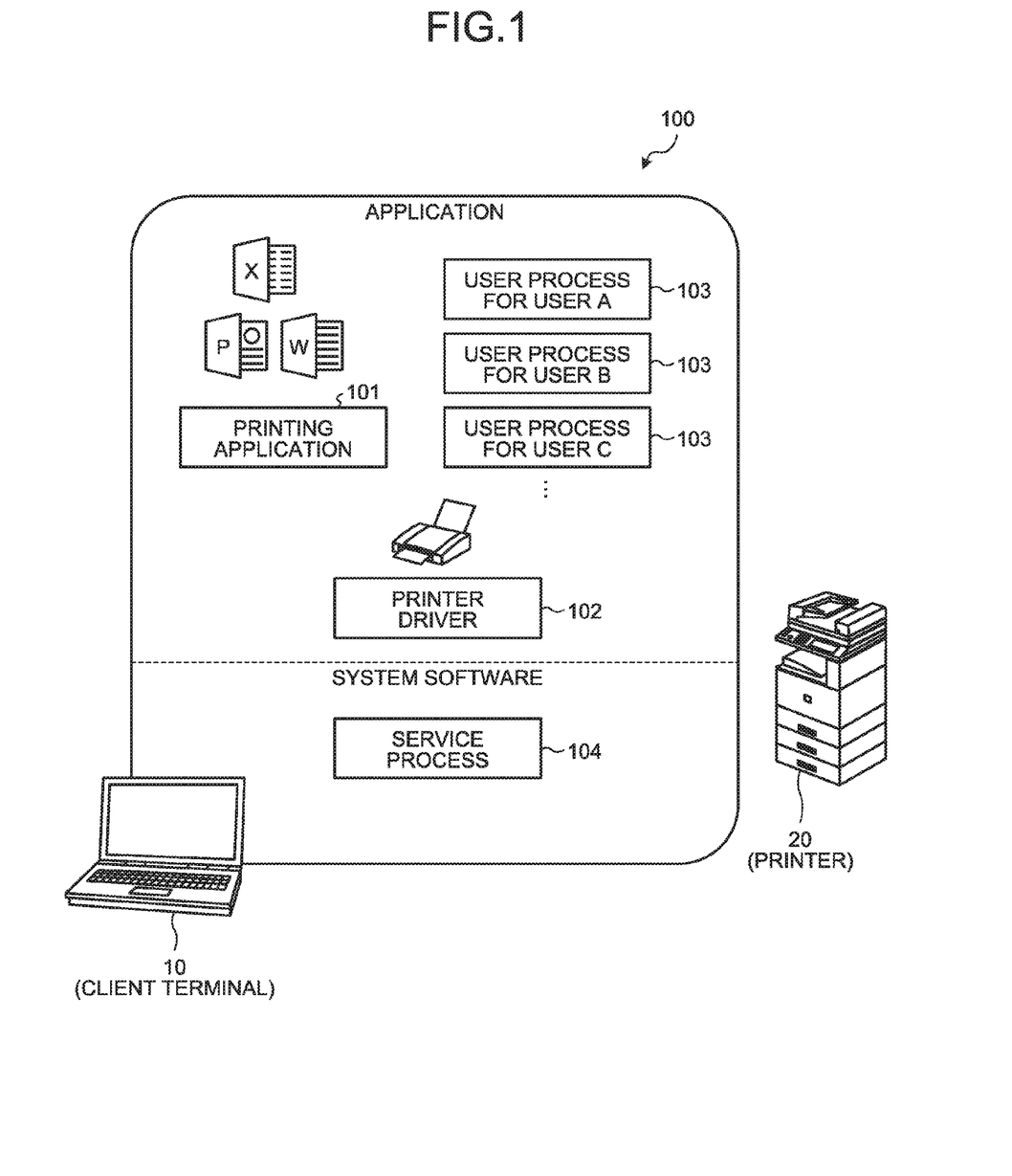
FIG. 1 is a diagram illustrating an example of a configuration of an information processing system.

FIG. 1 is a diagram illustrating an example of a configuration of an information processing system 100 of an embodiment. As illustrated in FIG. 1, the information processing system 100 is a printing system including a client terminal 10 and one or more printers 20. The client terminal 10 and the printers 20 are connected in a wired or wireless way. The client terminal 10 and the printers 20 may be connected, for example, via a network, such as the Internet. In the information processing system 100, the client terminal 10 generates, in response to a user's operation, a print job that instructs to perform printing and transmits the generated print job to one, designated as a printer to be used, of the printers 20. The printer 20 that receives the print job performs printing based on the received print job.

The client terminal 10 is an information processing apparatus, such as a PC (Personal Computer), to be used by a user(s). The client terminal 10 is not limited to that of a desktop type and may be of a mobile type (e.g., a smartphone or a tablet computer), for example. In this example, the client terminal 10 corresponds to "information processing apparatus" in the appended claims.

In the example of FIG. 1, program instructions (hereinafter, "programs") running on an operating system (OS) of the client terminal 10 include printing application software (hereinafter, "printing application") 101, such as Word or Excel, for generating a print job in response to a user's operation, a printer driver 102 for converting the print job generated by the printing application 101 into a format printable by the printer 20, a plurality of user processes 103 that are in a one-to-one correspondence with a plurality of users and respectively run in user sessions, and a service process 104 that runs as a common service within the system. The service process 104 includes a spooler (print spooler) for temporarily storing print jobs converted by the printer driver 102 and sequentially executing the print jobs, a queue monitoring component 110, which will be described later, and a rule-based print-service component 120, which will be described later. The above-described print job contains attribute information containing information designating one of the printers 20 as a printer to be used, a printing condition, and user information by which a user that has requested printing is identified, and data to be printed (drawing data). In this example, the OS has a function of authenticating each user.

In the example of FIG. 1, the printing application 101, the printer driver 102, and the plurality of user processes 103 are application software for providing predetermined functions by utilizing hardware resources of the client terminal 10. The service process 104 is system software for supporting operation and use itself of the client terminal 10 by, for example, managing and controlling hardware of the client terminal 10.

Figure 2:
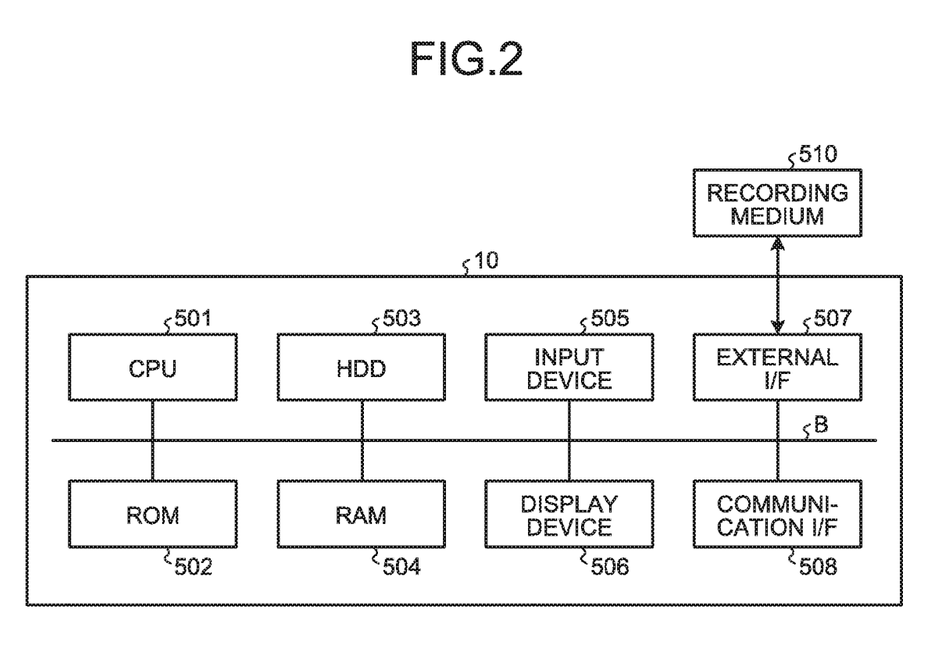
FIG. 2 is a diagram illustrating an example of a hardware architecture of a client terminal.

FIG. 2 is a diagram illustrating an example of a hardware architecture of the client terminal 10. As illustrated in FIG. 2, the client terminal 10 includes a CPU (central processing unit) 501, a ROM (read only memory) 502, an HDD (hard disk drive) 503, a RAM (random access memory) 504, an input device 505, a display device 506, an external I/F (interface) 507, and a communication I/F 508 that are respectively mutually connected via a bus B.

The CPU 501 is a computing device that reads out programs and data from a storage device, such as the ROM 502 or the HDD 503, into the RAM 504 and performs processing, thereby controlling the entire client terminal 10 and implementing various functions.

The ROM 502 is an example of a non-volatile semiconductor memory (a storage device) capable of holding programs and data even after power source is turned off (i.e., even after electric power supply to the client terminal 10 is cut off). The ROM 502 stores programs and data including a BIOS (basic input-output system) to be executed at startup of the client terminal 10, OS settings, and network settings.

The HDD 503 is an example of a non-volatile storage device that stores programs and data. The HDD 503 stores the OS, which is basic software that controls the entire client terminal 10, and the application software (hereinafter, simply referred to as "application") that provides various functions on the OS. The client terminal 10 may use, in lieu of the HDD 503, a drive device (e.g., an SSD (solid state drive)) that uses a flash memory as a storage medium.

The RAM 504 is an example of a volatile storage device that temporarily stores programs and data and functions as a working area for processing performed by the CPU 501.

The input device 505 is a device used by a user in entering various operation signals. The input device 505 can be embodied as a keyboard and a mouse, or a touch panel, for example. The display device 506 is a device that displays various types of information (e.g., a result of processing performed by the client terminal 10). The display device 506 can be embodied as a liquid-crystal display device, for example. The input device 505 and the display device 506 may be integrated in, for example, a touch panel. The input device 505 and the display device 506 may be configured to be connected and used as necessity arises.

The external I/F 507 is an interface for an external device. Although a recording medium 510 is presented as an example of the external device in the example of FIG. 2, the external device is not limited thereto. The client terminal 10 can read out data from the recording medium 510 and write data to the recording medium 510 via the external I/F 507. Examples of the recording medium 510 include a flexible disk, a CD, a DVD (digital versatile disk), an SD memory card, and a USB (universal serial bus) memory.

The communication I/F 508 is an interface for communicating with the printers 20. For example, when the client terminal 10 and the printer 20 are configured to communicate with each other via a network, such as the Internet, the communication I/F 508 is an interface for connecting the client terminal 10 to the network.

Figure 3:
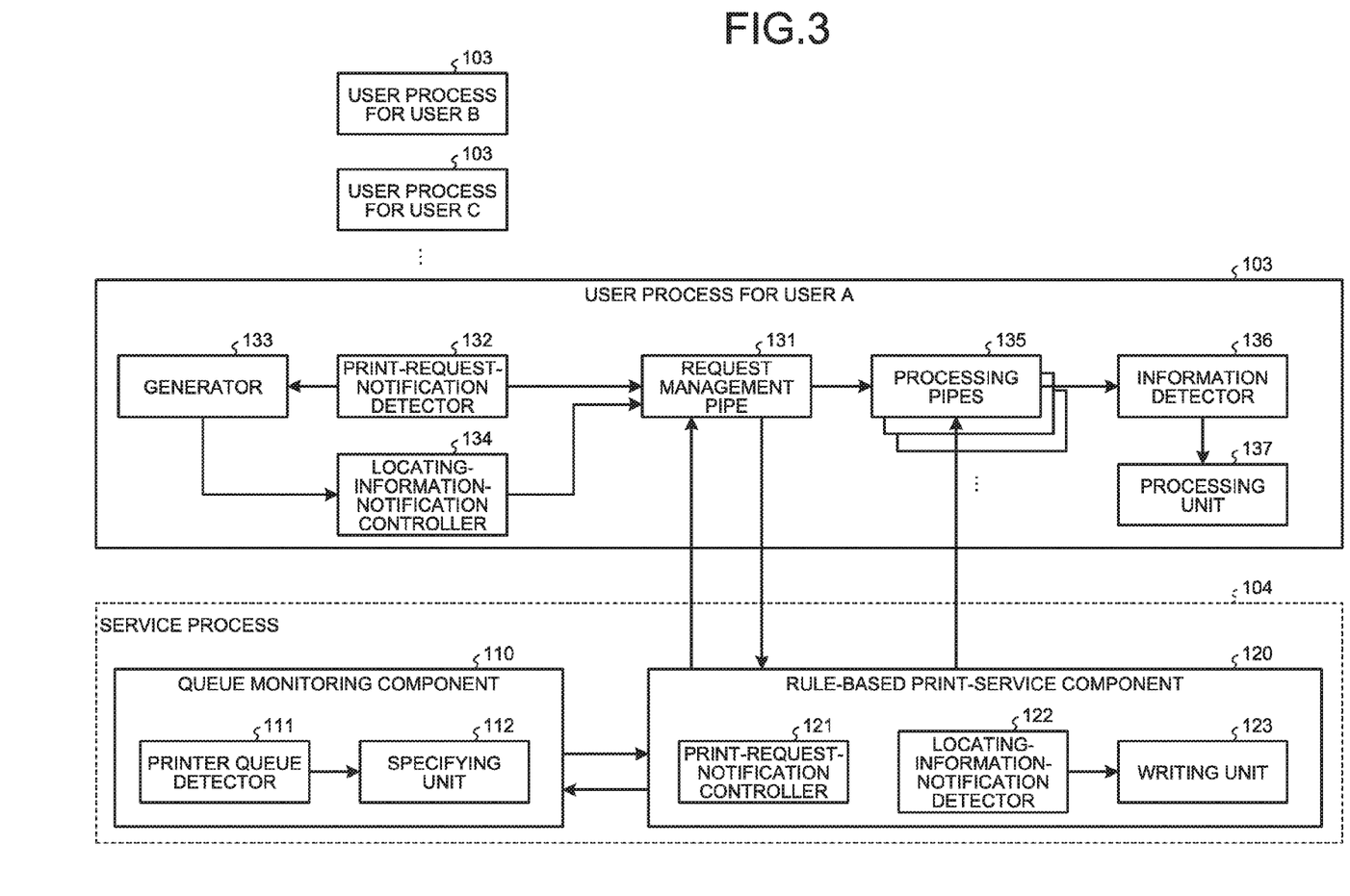
FIG. 3 is a diagram illustrating an example of functions provided by the client terminal.

FIG. 3 is a diagram illustrating an example of functions provided by application programs according to the present embodiment installed on the client terminal 10. Although FIG. 3 mainly illustrates functions related to the present embodiment, functions provided by the client terminal 10 are not limited thereto. As illustrated in FIG. 1, in addition to the application programs according to the present embodiment, one or more application programs implementing functions as the printing application 101 and one or more printer driver programs implementing functions as the printer driver 102 are installed on the client terminal 10. Other application programs may be installed on the client terminal 10.

As illustrated in FIG. 3, the application programs according to the present embodiment are installed and executed, thereby starting, on the client terminal 10, the plurality of user processes 103 that are in a one-to-one correspondence with a plurality of users. Each of the user processes 103 is started when a corresponding user logs in (i.e., when the user is authenticated as being authorized to use the client terminal 10) and closed when the user logs out. When, while keeping the logged-in state, "Switch User" is performed and another user logs in, the user processes 103 for the respective users are in a running state.

For example, when, in a situation where a working environment for a logged-in user A is provided by the client terminal 10 and a screen adapted to settings for the user A is displayed (such that, for example, a desktop screen for the user A is displayed) on the display device 506, the application program according to the present embodiment desires to display a certain message on the screen, control is to be performed via the user process for the user A. Permission to control processing of the user process 103 for a user B is generally not granted to the user process 103 for the user A. However, the application program according to the present embodiment has a contrivance for causing the user process 103 for a user and the service process 104 to cooperate. For convenience of description, the description below is made through an example of the user process associated with the user A (the user process 103 for the user A), each of the other user processes 103 has similar functions.

As illustrated in FIG. 3, the service process 104 includes the queue monitoring component 110 and the rule-based print-service component 120. In this example, communication between the queue monitoring component 110 and the rule-based print-service component 120 is performed using an HTTP (hypertext transfer protocol) protocol, while communication between the rule-based print-service component 120 and the user process 103 is performed using named pipes. The user processes 103 of the same number as currently-logged-in users can be started simultaneously. Accordingly, allocating ports respectively to the user processes 103 is likely to cause shortage of ports and therefore inappropriate. Under the circumstances, in the present embodiment, allocating a port to each of the user processes 103 is avoided by performing communication between (the rule-based print-service component 120 of) the service process 104 and the user process 103 using the named pipes.

The queue monitoring component 110 includes a printer queue detector 111 and a specifying unit 112. The printer queue detector 111 detects whether or not a print job is stuck in printer queue (which is contained in the spooler) where print jobs are to be stored. When the printer queue detector 111 detects that a print job is stuck in the printer queue, the specifying unit 112 specifies user information, by which a user that has requested printing is identified. Any method can be used to specify the user information. In the present embodiment, because the user information is described in the attribute information contained in the print job, the specifying unit 112 can specify the user information by accessing the attribute information contained in the print job stuck in the printer queue. In the embodiment, causing the print job to be stuck in the printer queue can be regarded as synonymous with accepting a print request from a user.

The rule-based print-service component 120, which is an example of "providing unit", provides information for use in processing to be performed by one, which is associated with the user information specified by the specifying unit 112, of the plurality of user processes 103 that are in the one-to-one correspondence with the plurality of currently-logged-in users. As will be specifically described later, in the example of FIG. 3, the rule-based print-service component 120 includes a print-request-notification controller 121, a locating-information-notification detector 122, and a writing unit 123.

The print-request-notification controller 121 performs control for sending a print request notification indicating that a print request has been accepted to the user process 103 associated with the user information specified by the specifying unit 112. In this example, the print-request-notification controller 121 performs, as the control for sending a print request notification to the user process 103, control of writing the print request notification to a request management pipe 131 (an example of "request management intermediary"), which will be described later, included in the user process 103 associated with the user information specified by the specifying unit 112. In this example, the request management pipe 131 is a named pipe to which a name containing the user information described in the above-described attribute information is assigned. In this example, the print-request-notification controller 121 performs control of locating the request management pipe 131 containing the user information specified by the specifying unit 112 and writing the print request notification to the thus-located request management pipe 131.

For convenience of description, functions provided by the user process 103 for the user A are described below. As illustrated in FIG. 3, the user process 103 includes the request management pipe 131, a print-request-notification detector 132, a generator 133, a locating-information-notification controller 134, processing pipes 135 generated by the generator 133, an information detector 136, and a processing unit 137.

The request management pipe 131, which is an example of "request management intermediary", is an intermediary containing the user information, by which the user associated with the user process 103 is identified, and being for use in communicating the print request notification and a locating information notification, which will be described later. In this example, the request management pipe 131 is a named pipe to which a name containing the user information is assigned; however, the request management pipe 131 is not limited thereto. The print-request-notification detector 132 detects a print request notification. In this example, the print-request-notification detector 132 can detect a print request notification by detecting whether or not a print request notification is written to the request management pipe 131.

When a print request notification is detected by the print-request-notification detector 132, the generator 133 generates the processing pipe 135 (an example of "processing intermediary") for accepting information for use in processing to be performed by the user process 103. In this example, the processing pipe 135 is a named pipe. The generator 133 assigns a unique name to the generated processing pipe 135. The generator 133 generates a single instance of the processing pipe 135 for a single process.

The locating-information-notification controller 134 performs control for sending a locating information notification (in this example, the name assigned to the processing pipe 135) indicating locating information, by which the processing pipe 135 can be located, to the rule-based print-service component 120 ("providing unit"). In this example, the locating-information-notification controller 134 performs, as the control for sending the locating information notification to the rule-based print-service component 120, control of writing the locating information notification to the request management pipe 131.

The information detector 136 detects information written to the processing pipe 135. In this example, the information detector 136 detects information, which is written by the writing unit 123 of the rule-based print-service component 120 to the processing pipe 135, for use in processing to be performed by the user process 103. A configuration in which the information detector 136 is generated by the generator 133 concurrently with generation of the processing pipe 135 so that a one-to-one correspondence holds between the information detectors 136 and the processing pipes 135 may be employed. When the information written to the processing pipe 135 is detected by the information detector 136, the processing unit 137 performs processing using the information stored in the processing pipe 135. In this example, the information for use in processing to be performed by the user process 103 is the attribute information contained in the print job. The processing unit 137 performs processing using the attribute information stored in the processing pipe 135. More specifically, the processing unit 137 performs corresponding processing based on the attribute information stored in the processing pipe 135 and a predetermined rule. When, for example, the predetermined rule is defined such that a dialog box for informing a user of the printer 20 to be used and color attribute is to be displayed when a print request from the "user A" is accepted, the processing unit 137 performs processing of displaying the dialog box on the display device 506 using information indicating the printer 20 to be used and the color attribute contained in the attribute information stored in the processing pipe 135. Information indicating the predetermined rule may be stored in a storage device, such as the HDD 503.

Functions provided by the rule-based print-service component 120 are described below. The locating-information-notification detector 122 detects a locating information notification indicating that locating information is sent (sent from the user process 103). In this example, the locating-information-notification detector 122 detects a locating information notification by detecting whether or not locating information is written to the request management pipe 131 (which is the request management pipe 131 to which the name containing the user information specified by the specifying unit 112 is assigned) included in the user process 103 associated with the user information specified by the specifying unit 112.

When a locating information notification is detected by the locating-information-notification detector 122, the writing unit 123 writes information for use in processing to the processing pipe 135 located by the locating information indicated by the locating information notification. In this example, the writing unit 123 locates the processing pipe 135 named with the same name as the locating information indicated by the locating information notification detected by the locating-information-notification detector 122, and writes the attribute information contained in the print job that is detected as being stuck by the printer queue detector 111 to the located processing pipe 135.

Figure 4:
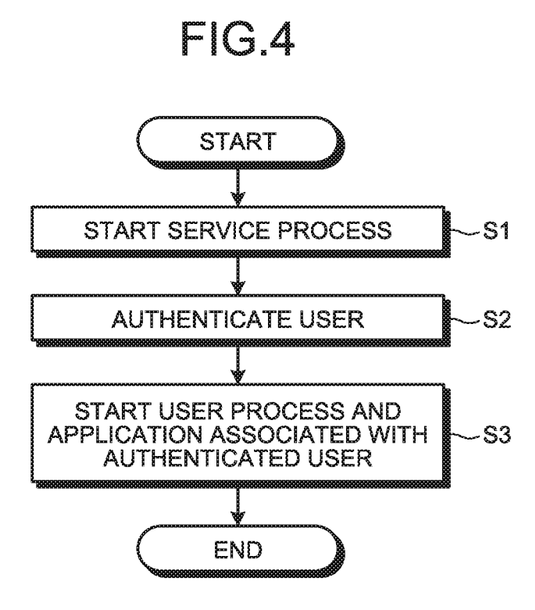
FIG. 4 is a flow diagram illustrating an example of a procedure for starting a service process and a user process.
Figure 5:
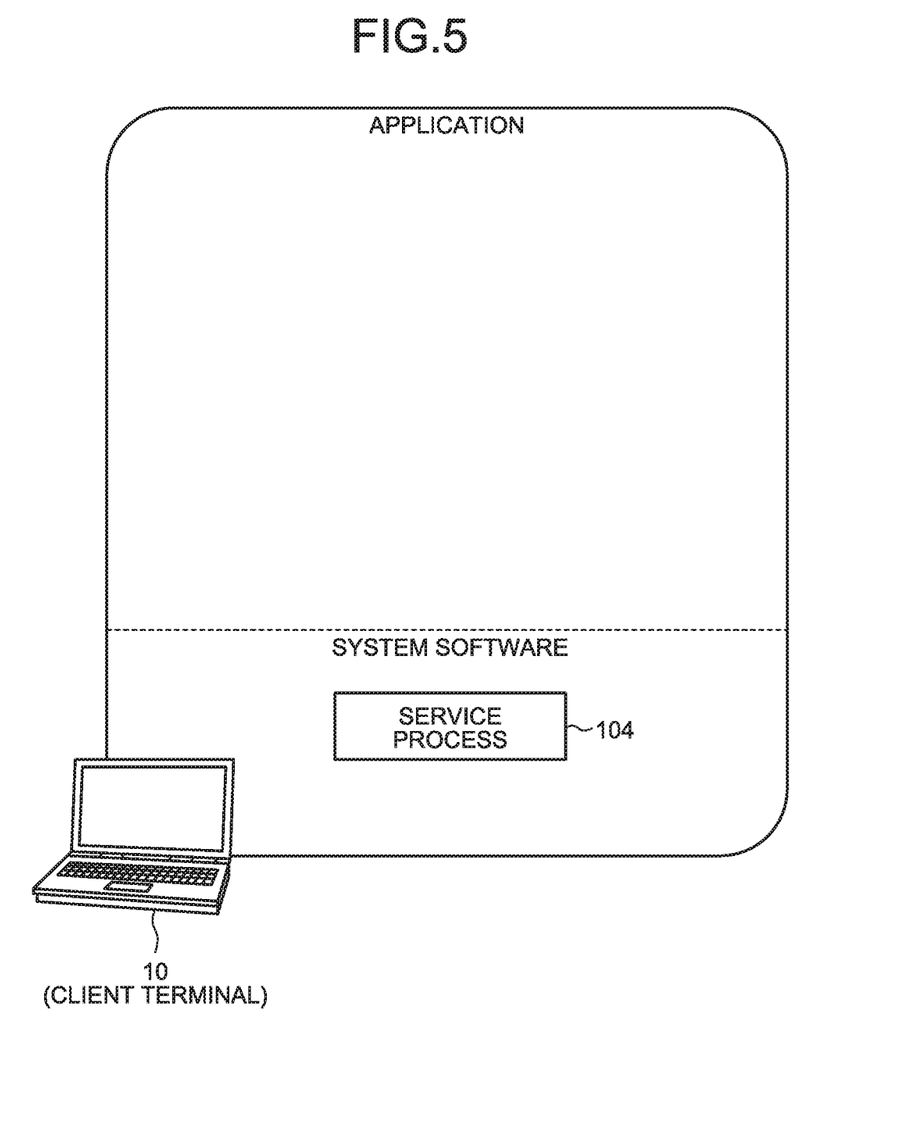
FIG. 5 is a diagram illustrating a state of a program running on an OS of the client terminal.

FIG. 4 is a flow diagram illustrating an example of a procedure for starting the service process 104 and the user process 103. When power supply to the client terminal 10 is started (i.e., when power source is turned on), the OS starts the service process 104 (step S1). FIG. 5 is a diagram illustrating a state of a program running on the OS of the client terminal 10, in which only the service process 104 is running.

The description with reference to FIG. 4 continues below. Next, after authenticating a user (step S2), the OS starts the user process 103 and an application(s) associated with the authenticated user (step S3).

Figure 6:
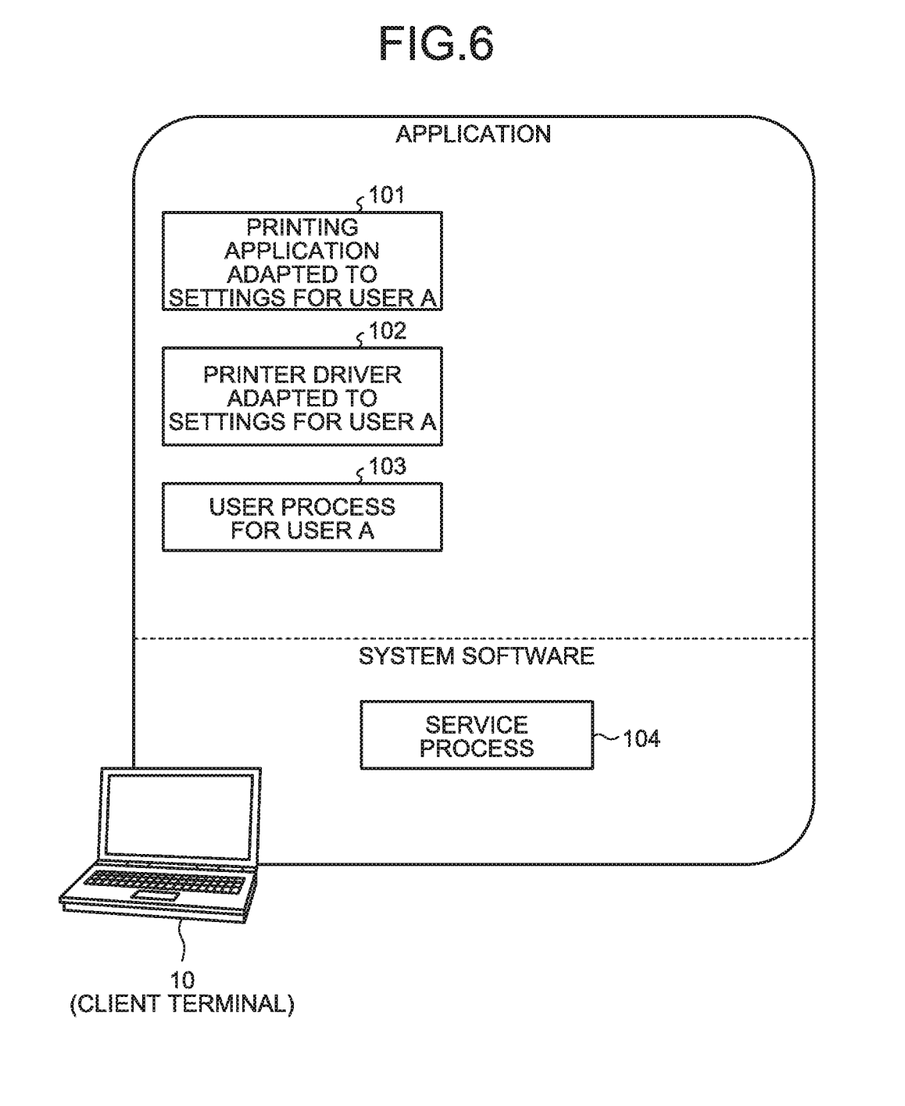
FIG. 6 is a diagram illustrating a state of programs running on the OS of the client terminal.

Assume a situation where, for example, the user A has been authenticated. FIG. 6 is a diagram illustrating a state of programs running on the OS of the client terminal 10 in this situation. The example of FIG. 6 depicts a state where, in addition to the service process 104, the user process 103 for the user A, the printing application 101 adapted to settings for the user A and the printer driver 102 adapted to settings for the user A are running.

Figure 7:
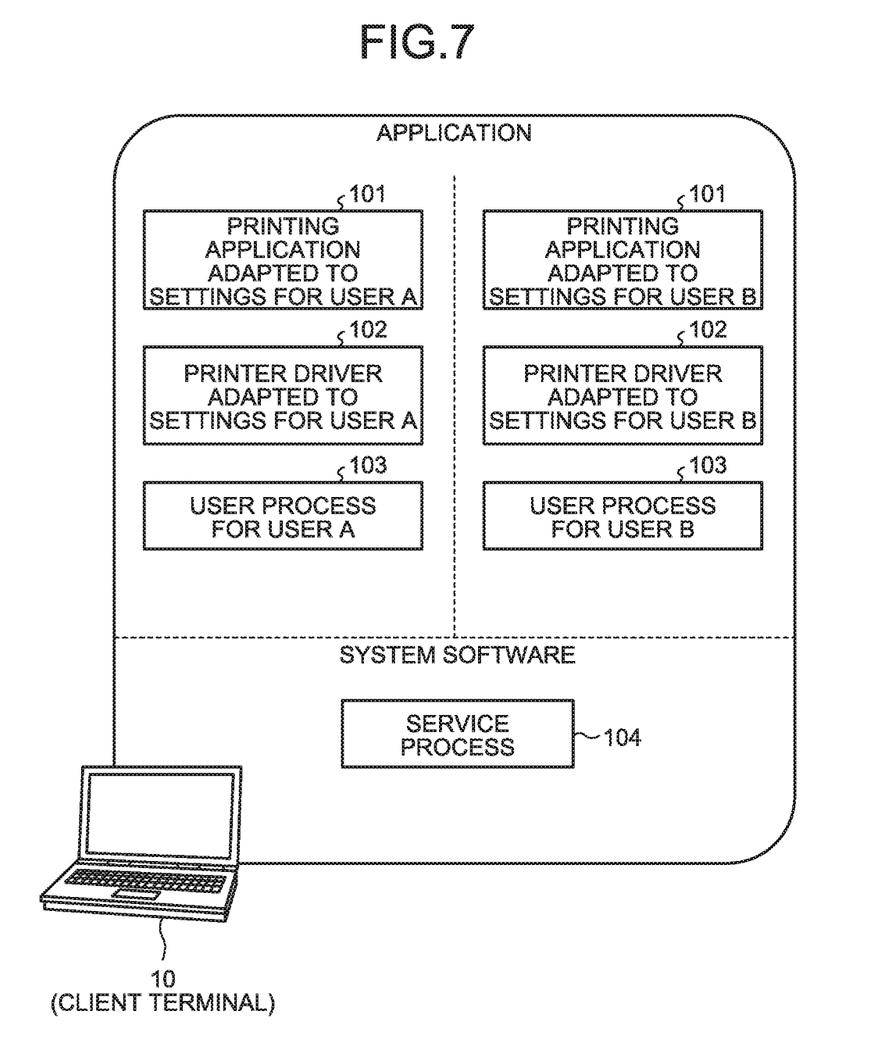
FIG. 7 is a diagram illustrating a state of programs running on the OS of the client terminal.

Assume a situation where, for example, after the user A has been authenticated, the user B is authenticated with the user process 103 for the user A kept running. FIG. 7 is a diagram illustrating a state of programs running on the OS of the client terminal 10 in this situation. The example of FIG. 7 depicts a state where, in addition to the service process 104, the user process 103 for the user A, the printing application 101 adapted to the settings for the user A, and the printer driver 102 adapted to the settings for the user A, the user process 103 for the user B, the printing application 101 adapted to settings for the user B, and the printer driver 102 adapted to settings for the user B are running.

Figure 8:
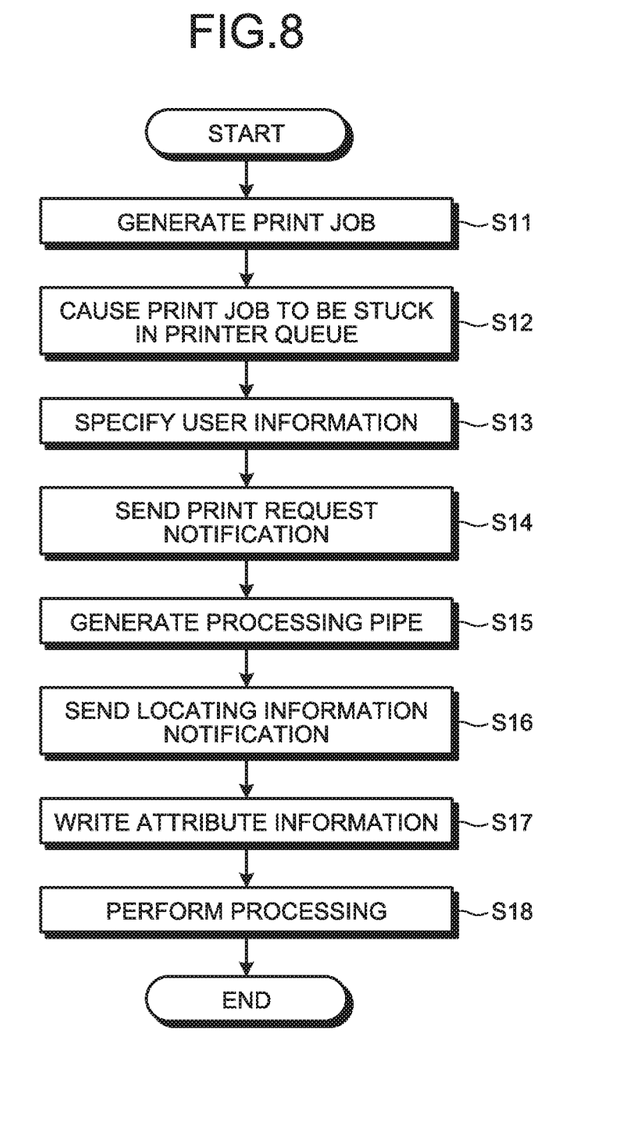
FIG. 8 is a flowchart illustrating an example of how the client terminal operates.

FIG. 8 is a flowchart illustrating an example of how the client terminal 10 operates after a user has been authenticated. For convenience of description, hereinafter, it is assumed that the user A has been authenticated. First, the printing application 101 generates a print job in response to an operation of the user A (step S11). Next, the spooler (the service process 104) causes the print job generated at step S11 to be stuck in printer queue (step S12). Upon detecting that the print job is stuck in the printer queue, the queue monitoring component 110 specifies user information associated with the stuck print job (step S13). The queue monitoring component 110 sends the specified user information and attribute information (which is information including, for example, a printing condition, for use in processing to be performed by the user process 103) contained in the print job to the rule-based print-service component 120. The rule-based print-service component 120 may return an appropriate value as a response to the sent information.

Next, the rule-based print-service component 120 performs control for sending a print request notification indicating that a print request has been accepted to the user process 103 associated with the user information specified at step S13 (step S14). This has already been specifically described above. Next, upon detecting the print request notification, the user process 103 generates the processing pipe 135 (step S15) and performs control for sending a locating information notification indicating locating information, by which the generated processing pipe 135 can be located, to the rule-based print-service component 120 (step S16). This has already been specifically described above.

Next, upon detecting the locating information notification sent from the user process 103, the rule-based print-service component 120 writes the attribute information received from the queue monitoring component 110 to the processing pipe 135 located using the locating information indicated by the locating information notification (step S17). This has already been specifically described above. Upon detecting the attribute information written to the processing pipe 135, the user process 103 performs processing using the attribute information (step S18). This has already been specifically described above.

As described above, in the present embodiment, the user process 103 includes the request management pipe 131 and the processing pipes 135 separately. Accordingly, the need for suspending accepting a next print request notification (i.e., writing the print request notification to the request management pipe 131) until completion of one process is eliminated and, accordingly, it is possible to accept a next print request notification and generate the processing pipe 135 therefor even while one process is being performed. This advantageously enables parallel processing. Thus, a next print request notification can be written to the request management pipe 131 at any time after writing attribute information of step S17 is completed.

Figure 9:
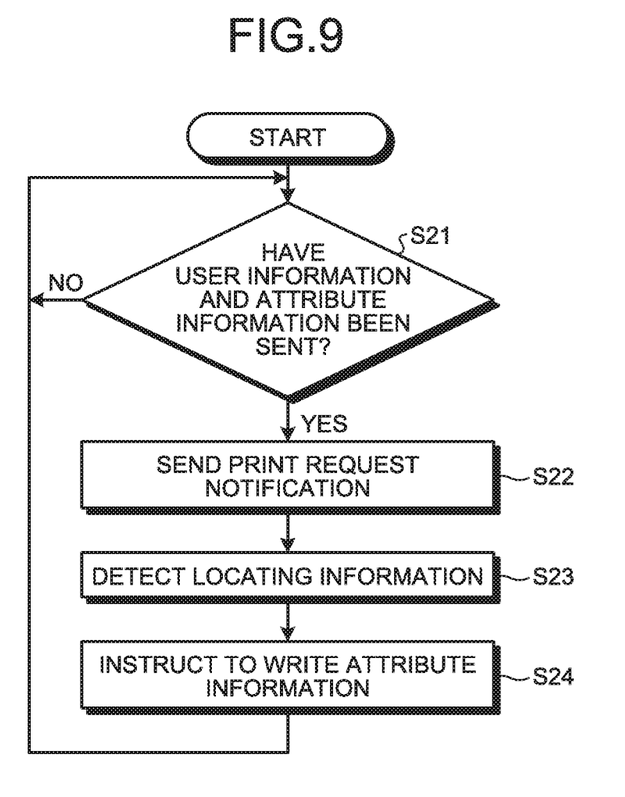
FIG. 9 is a flowchart illustrating an example of how a print-request-notification controller and a locating-information-notification detector of a rule-based print-service component operate.

FIG. 9 is a flowchart illustrating an example of how the print-request-notification controller 121 and the locating-information-notification detector 122 of the rule-based print-service component 120 operate. As illustrated in FIG. 9, the print-request-notification controller 121 waits for user information and attribute information that are sent from the queue monitoring component 110 (step S21). When the result of step S21 is Yes (Yes at step S21), the print-request-notification controller 121 performs control for sending a print request notification indicating that a print request has been accepted to the user process 103 associated with the user information sent at step S21 (step S22). As described above, the print-request-notification controller 121 writes the print request notification indicating that the print request has been accepted to the request management pipe 131 included in the user process 103 associated with the user information sent at step S21. Thereafter, the locating-information-notification detector 122 detects a locating information notification by detecting whether or not locating information is written to the request management pipe 131 included in the user process 103 associated with the user information sent at step S21 (step S23). Upon detecting a locating information notification, the locating-information-notification detector 122 passes the detected locating information and the attribute information sent at step S21 to the writing unit 123 and instructs the writing unit 123 to write the attribute information (step S24). Because it is possible to write a next print request notification to the request management pipe 131 included in the user process 103 associated with the user information sent at step S21, step S21 and its subsequent steps may be repeated.

As described above, upon detecting that a print job is stuck in printer queue, the service process 104, which is system software, specifies user information, by which a user that has requested printing is identified, and provides information for use in processing to be performed by one, which is associated with the specified user information, of the plurality of user processes 103 that are in a one-to-one correspondence with a plurality of currently-logged-in users to the one user process 103. Hence, the service process 104 can appropriately allocate processing to each of the plurality of user processes 103 that are in the one-to-one correspondence with the plurality of currently-logged-in users.

The programs to be executed by (the CPU 501 of) the client terminal 10 of each of the above-described embodiments may be configured to be provided in a form recorded in a non-transitory computer-readable recording medium, such as a CD-ROM, a flexible disk (FD), a CD-R, a DVD, or a USB memory as an installable file or an executable file. Alternatively, the programs may be configured to be provided or delivered via a network, such as the Internet. The various programs may be configured to be provided in a form loaded into a ROM or the like in advance.

According to an aspect of the present invention, it is possible to allocate processing to user processes appropriately from a service process and control the same.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:
1. An information processing apparatus comprising:
a memory storing a program of instructions; and
a processor configured to execute the program of instructions to
execute a plurality of user processes on the information processing apparatus, the plurality of user processes associated with separate, respective currently-logged-in users of a plurality of currently-logged-in users of the information processing apparatus,
detect that a print job is caused to be stuck in a printer queue associated with storage of printer jobs, the print job containing attribute information and data to be printed, the attribute information containing a printing condition, specify user information associated with a particular currently-logged-in user of the plurality of currently-logged-in users that has requested printing in association with the print job, based on the detecting, provide a particular instance of information for use in processing to be performed by a particular user process of the plurality of user processes based on a determination that the particular user process is associated with the specified user information, send a print request notification to the particular user process, the print request notification indicating that a print request has been accepted, and execute the particular user process to perform the processing based on the particular instance of information, the executing the particular user process including detecting the print request notification, generating a processing intermediary to accept the particular instance of information for use in the processing based on the detecting the print request notification, sending a locating information notification indicating locating information, by which the processing intermediary can be located, and performing the processing using the particular instance of information stored in the processing intermediary.

2. The information processing apparatus according to claim 1, wherein the processor is further configured to execute the program of instructions to detect the locating information notification, and write the particular instance of information for use in for the processing to the processing intermediary based on detection of the locating information notification, the processing intermediary located using the locating information indicated by the locating information notification.

3. The information processing apparatus according to claim 1, wherein the executing the particular user process includes including a request management intermediary that contains the user information and is associated with communicating the print request notification and the locating information notification, the processor is configured to execute the program of instructions to detect the print request notification based on detecting whether that the print request notification is written to the request management intermediary, and the processor is configured to execute the program of instructions to write the locating information notification to the request management intermediary.

4. The information processing apparatus according to claim 3, wherein the processor is configured to execute the program of instructions to perform, control for sending the print request notification to the particular user process, control of writing the print request notification to the request management intermediary included in the particular user process associated with the specified user information, and detect the locating information notification based on detecting that the locating information is written to the request management intermediary.

5. The information processing apparatus according to claim 3, wherein the request management intermediary and the processing intermediary are named pipes.

6. The information processing apparatus according to claim 2, wherein the processor is configured to execute the program of instructions to write, as the particular instance of information for use in the processing, the attribute information contained in the print job to the processing intermediary.

7. The information processing apparatus according to claim 6, wherein the processor is configured to execute the program of instructions to perform the processing based on the attribute information stored in the processing intermediary and a particular rule.

8. An information processing method, comprising:

executing a plurality of user processes on an information processing apparatus, the plurality of user processes associated with separate, respective currently-logged-in users of a plurality of currently-logged-in users of the information processing apparatus;

performing printer queue detection based on detecting that a print job is caused to be stuck in a printer queue associated with storage of printer jobs, the printer job containing attribute information and data to be printed, the attribute information containing a printing condition;

specifying user information associated with a particular currently-logged-in user of the plurality of currently-logged-in users that has requested printing in association with the print job, based on the detecting; and providing a particular instance of information for use in processing to be performed by a particular user process of the plurality of user processes based on a determination that the particular user process is associated with the specified user information, sending a print request notification to the particular user process, the print request notification indicating that a print request has been accepted, and executing the particular user process to perform the processing based on the particular instance of information, the executing the particular user process including detecting the print request notification, generating a processing intermediary to accept the particular instance of information for use in the processing based on the detecting the print request notification, sending a locating information notification indicating locating information, by which the processing intermediary can be located, and performing the processing using the particular instance of information stored in the processing intermediary.

9. A non-transitory computer-readable recording medium containing instructions that, when executed by a computer, cause the computer to perform:

executing a plurality of user processes on an information processing apparatus, the plurality of user processes associated with separate, respective currently-logged-in users of a plurality of currently-logged-in users of the information processing apparatus;

performing printer queue detection based on detecting that a print job is caused to be stuck in a printer queue associated with storage of printer jobs, the printer job containing attribute information and data to be printed, the attribute information containing a printing condition;

specifying user information associated with a particular currently-logged-in user of the plurality of currently-logged-in users that has requested printing in association with the print job, based on the detecting; and providing a particular instance of information for use in processing to be performed by a particular user process of the plurality of user processes based on a determination that the particular user process is associated with the specified user information, sending a print request notification to the particular user process, the print request notification indicating that a print request has been accepted, and executing the particular user process to perform the processing based on the particular instance of information, the executing the particular user process including detecting the print request notification, generating a processing intermediary to accept the particular instance of information for use in the processing based on the detecting the print request notification, sending a locating information notification indicating locating information, by which the processing intermediary can be located, and performing the processing using the particular instance of information stored in the processing intermediary.

10. The method according to claim 8, further comprising:
detecting the locating information notification; and
writing the particular instance of information for use in the processing to the processing intermediary based on detection of the locating information notification, the processing intermediary located using the locating information indicated by the locating information notification.

11. The method according to claim 8, wherein
the executing the particular user process includes including a request management intermediary that contains the user information and is associated with communicating the print request notification and the locating information notification,
the method further includes detecting the print request notification based on detecting that the print request notification is written to the request management intermediary, and
the method further includes writing the locating information notification to the request management intermediary.

12. The method according to claim 11, further comprising:
performing, to send the print request notification to the particular user process, control of writing the print request notification to the request management intermediary included in the particular user process associated with the specified user information, and
detecting the locating information notification based on detecting that the locating information is written to the request management intermediary.

13. The method according to claim 11, wherein the request management intermediary and the processing intermediary are named pipes.

14. The method according to claim 10, further comprising:
writing, as the particular instance of information for use in the processing, the attribute information contained in the print job to the processing intermediary.

15. The method according to claim 14, further comprising:
performing the processing based on the attribute information stored in the processing intermediary and a particular rule.

16. The non-transitory computer-readable recording medium according to claim 9, the instructions, when executed by the computer, further cause the computer to perform:
detecting the locating information notification; and
writing the particular instance of information for use in the processing to the processing intermediary based on detection of the locating information notification, the processing intermediary located using the locating information indicated by the locating information notification.

17. The non-transitory computer-readable recording medium according to claim 9, wherein
the executing the particular user process includes including a request management intermediary that contains the user information and is associated with communicating the print request notification and the locating information notification,
the instructions, when executed by the computer, further cause the computer to detect the print request notification based on detecting that the print request notification is written to the request management intermediary, and
the instructions, when executed by the computer, further cause the computer to write the locating information notification to the request management intermediary.

18. The non-transitory computer-readable recording medium according to claim 17, the instructions, when executed by the computer, further cause the computer to perform:
Performing, to send the print request notification to the particular user process, control of writing the print request notification to the request management intermediary included in the particular user process associated with the specified user information, and
detecting the locating information notification based on detecting that the locating information is written to the request management intermediary.

19. The non-transitory computer-readable recording medium according to claim 17, wherein the request management intermediary and the processing intermediary are named pipes.

20. The non-transitory computer-readable recording medium according to claim 16, the instructions, when executed by the computer, further cause the computer to perform:
writing, as the particular instance of information for use in the processing, the attribute information contained in the print job to the processing intermediary.

* * * * *